United States Patent
Tsuji et al.

(10) Patent No.: US 12,465,369 B2
(45) Date of Patent: Nov. 11, 2025

(54) LIGATION DEVICE AND ENGAGEMENT METHOD

(71) Applicant: OLYMPUS CORPORATION, Hachioji (JP)

(72) Inventors: Tomohiro Tsuji, Tokyo (JP); Kensuke Uesaka, Tokyo (JP); Shinya Ansai, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 292 days.

(21) Appl. No.: 17/678,395

(22) Filed: Feb. 23, 2022

(65) Prior Publication Data

US 2022/0175387 A1    Jun. 9, 2022

Related U.S. Application Data

(63) Continuation of application No. 17/358,180, filed on Jun. 25, 2021, which is a continuation of application No. PCT/JP2018/048599, filed on Dec. 28, 2018.

(51) Int. Cl.
*A61B 17/128* (2006.01)
*A61B 17/122* (2006.01)

(52) U.S. Cl.
CPC ........ *A61B 17/1285* (2013.01); *A61B 17/122* (2013.01)

(58) Field of Classification Search
CPC .................. A61B 17/122; A61B 17/1285
See application file for complete search history.

(56) References Cited

U.S. PATENT DOCUMENTS

| | | | |
|---|---|---|---|
| 5,520,701 A | 5/1996 | Lerch | |
| 2008/0140089 A1 | 6/2008 | Kogiso et al. | |
| 2011/0245855 A1 | 10/2011 | Matsuoka et al. | |
| 2012/0109160 A1 | 5/2012 | Martinez et al. | |
| 2018/0049745 A1* | 2/2018 | Randhawa | A61B 17/1222 |
| 2018/0085122 A1* | 3/2018 | Ryan | A61B 17/1227 |
| 2018/0140300 A1* | 5/2018 | Randhawa | A61B 17/1285 |
| 2018/0153552 A1* | 6/2018 | King | A61B 17/128 |
| 2019/0150929 A1* | 5/2019 | Gregan | A61B 17/1285 |

FOREIGN PATENT DOCUMENTS

| | | |
|---|---|---|
| CN | 203539404 U | 4/2014 |
| JP | H07-008499 A | 1/1995 |
| JP | 2002-360591 A | 12/2002 |
| JP | 2004-305231 A | 11/2004 |
| JP | 2009-538699 A | 11/2009 |
| WO | 2006/068242 A1 | 6/2006 |
| WO | 2007/142977 A2 | 12/2007 |

OTHER PUBLICATIONS

Feb. 26, 2019 Search Report issued in International Patent Application No. PCT/JP2018/048599.
Jun. 20, 2024 Office Action issued in U.S. Appl. No. 17/358,180.

\* cited by examiner

*Primary Examiner* — Elizabeth Houston
*Assistant Examiner* — Jonathan A Hollm
(74) *Attorney, Agent, or Firm* — Oliff PLC

(57) ABSTRACT

A ligation device includes a first arm, a second arm, a holding tube, an operation wire, a sheath, and a link mechanism having a first link and a second link which are connected to each other and engage the holding tube with the sheath, wherein the link mechanism is configured to be switch between a disengaged configuration in which engagement between the holding tube and the sheath is released and an engaged configuration in which the holding tube is engaged with the sheath due to the operation wire.

20 Claims, 14 Drawing Sheets

(a)

(b)

(c)

LIGATION DEVICE AND ENGAGEMENT METHOD

The present invention relates to a ligation device and an engagement method. This application is a continuation application of U.S. patent application Ser. No. 17/358,180, which is a continuation based on International Patent Application No. PCT/JP2018/048599 filed on Dec. 28, 2018, and above-mentioned applications are incorporated herein by reference.

BACKGROUND

A clip device for an endoscope which ligates a target tissue with a clip to close an opening formed in a living tissue, to stop bleeding, or the like is known, for example, Japanese Unexamined Patent Application, first Publication No. 2002-3605911. In the endoscopic clip device, a sheath is inserted into an endoscopic channel and is inserted into a body via the channel.

In the clip device for an endoscope of Japanese Unexamined Patent Application, First Publication No 2002-360591, a ring extrusion coil is inserted into the sheath, and a clip closing ring of the clip is detachably fitted into a ring receiving member fixed to a tip end of the ring extrusion coil. When a proximal end of the clip is pulled into the clip closing ring, the clip is deformed, and an arm of the clip is closed from an open state The target tissue is ligated by the clip, as the target tissue is gripped by the clip and the proximal end portion of the clip is further pulled into the clip closing ring. After that, the clip closing ring is removed from the ring receiving member, and the clip and the clip closing ring are placed in the body.

SUMMARY

A ligation device according to a first aspect includes a first arm, a second arm configured to be able to come close to the first arm, a holding tube into which at least one of the first arm and the second arm is inserted, an operation wire connected to at least one of the first arm and the second arm, a sheath configured to accommodate the operation wire, and a link mechanism having a first link and a second link that are connected to each other and engage the holding tube with the sheath, wherein the link mechanism is configured to be switchable between a disengagement form in which engagement between the holding tube and the sheath is released and an engagement form in which the holding tube is engaged with the sheath due to the operation wire.

According to a second aspect, in the ligation device according to the first aspect, the first link may be movable outward in a radial direction of the sheath by the operation wire, and the link mechanism may be switched from the engagement form to the disengagement form by moving the first link outward in the radial direction.

According to a third aspect, in the ligation device according to the second aspect, the first link may be configured so that the first link moves outward in the radial direction of the sheath by a pulling operation of the operation wire.

According to a fourth aspect, in the ligation device according to the second aspect, the first link may include a leg part having a first leg and a second leg that are movable in a direction in which they approach each other and a direction in which they are separated from each other, the second link may be engaged with the leg part by the first leg and the second leg coming close to each other, and the leg part may be configured so that the first leg and the second leg are separated by an operation of the operation wire.

According to a fifth aspect, in the ligation device according to the fourth aspect, the first link may be provided in the sheath, and the second link may be provided in the holding tube.

According to a sixth aspect, in the ligation device according to the fourth aspect, the first link may be provided in the holding tube, and the second link may be provided in the sheath.

According to a seventh aspect, in the ligation device according to the fifth aspect, a large diameter part fixed to the operation wire and having an outer diameter larger than that of the operation wire, and a narrowed part provided on the first link, and in which a minimum separation distance between the first leg and the second leg is smaller than an outer diameter of the large diameter part and larger than the outer diameter of the operation wire may be included, and in the first link, the narrowed part may be pressed by the large diameter part of the operation wire, and thus the first leg and the second leg be separated from each other.

An engagement method according to an eighth aspect is an engagement method in which, in a ligation device including a first arm, a second arm configured to be able to come close to the first arm, a holding tube into which at least one of the first arm and the second arm is inserted, an operation wire connected to at least one of the first arm and the second arm, a sheath configured to accommodate the operation wire, a first leg and a second leg that are provided at a distal end of the sheath, a large diameter part which is provided on the operation wire and has an outer diameter larger than that of the operation wire, and a narrowed part provided on the sheath and in which a minimum separation distance between the first leg and the second leg is smaller than an outer diameter of the large diameter part and larger than the outer diameter of the operation wire, the holding tube and the sheath are engaged with each other. The method including a first step of bringing the large diameter part into contact with the narrowed part by moving the operation wire in a direction of a longitudinal axis, a second step of moving the operation wire to press the large diameter part against the narrowed part and separating the first leg from the second leg, the second step being performed after the first step, a third step of disposing the holding tube between the first leg and the second leg, the third step being performed after the second step, and a fourth step of causing the first leg and the second leg to come close to each other by moving the operation wire in a direction opposite to a movement direction in the first step, and engaging the sheath with the holding tube by the first leg and the second leg, the fourth step being performed after the third step.

A ligation device according to a ninth aspect includes a first arm, a second arm configured to be able to come close to the first arm, a holding tube into which at least one of the first arm and the second arm is inserted, an operation wire which is connected to at least one of the first arm and the second arm, a sheath configured to accommodate the operation wire, and a link mechanism having a first link and a second link that are connected to each other and engage the holding tube with the sheath, wherein the link mechanism is configured to be switchable between a disengagement form in which engagement between the holding tube and the sheath is released and an engagement form in which the holding tube is engaged with the sheath by rotation of the holding tube with respect to the sheath or rotation of the sheath with respect to the holding tube.

According to a tenth aspect, in the ligation device according to the ninth aspect, the first link may be provided in the sheath, a groove part extending in a circumferential direction around a longitudinal axis of the sheath may be formed in the sheath, the second link may be provided in the holding tube and may have a protrusion being insertable into the groove part, the protrusion may be inserted into the groove part by rotating the holding tube around the longitudinal axis with respect to the sheath, and the link mechanism may be configured to be brought into the engagement form by locking the protrusion in the groove part.

According to an eleventh aspect, in the ligation device according to the ninth aspect, the first link may be provided in the holding tube, a groove part extending in a circumferential direction around a longitudinal axis of the holding tube may be formed in the sheath, the second link may be provided in the sheath and may have a protrusion being insertable into the groove part, the protrusion may be inserted into the groove part by rotating the sheath around the longitudinal axis with respect to the holding tube, and the link mechanism may be configured to be brought into the engagement form by locking the protrusion in the groove part.

According to a twelfth aspect, in the ligation device according to the ninth aspect, the link mechanism may have a screw structure of a male screw and a female screw and may be switchable between the disengagement form and the engagement form by rotating the holding tube with respect to the sheath.

DETAILED DESCRIPTION OF EXEMPLARY EMBODIMENTS

First Embodiment

Figure 1A:
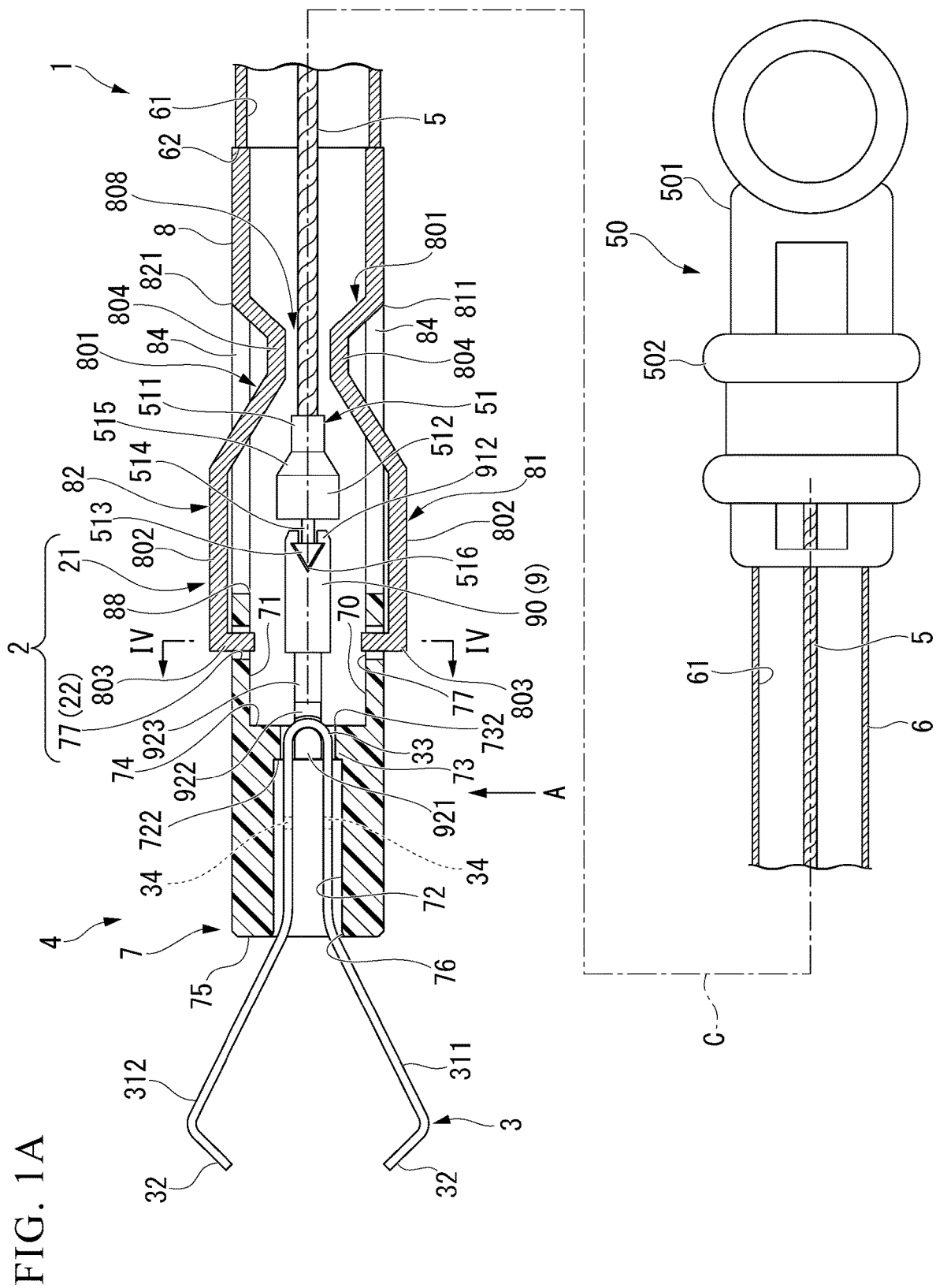
FIG. 1A is a partial cross-sectional view showing a ligation device according to an exemplary embodiment.
Figure 2:
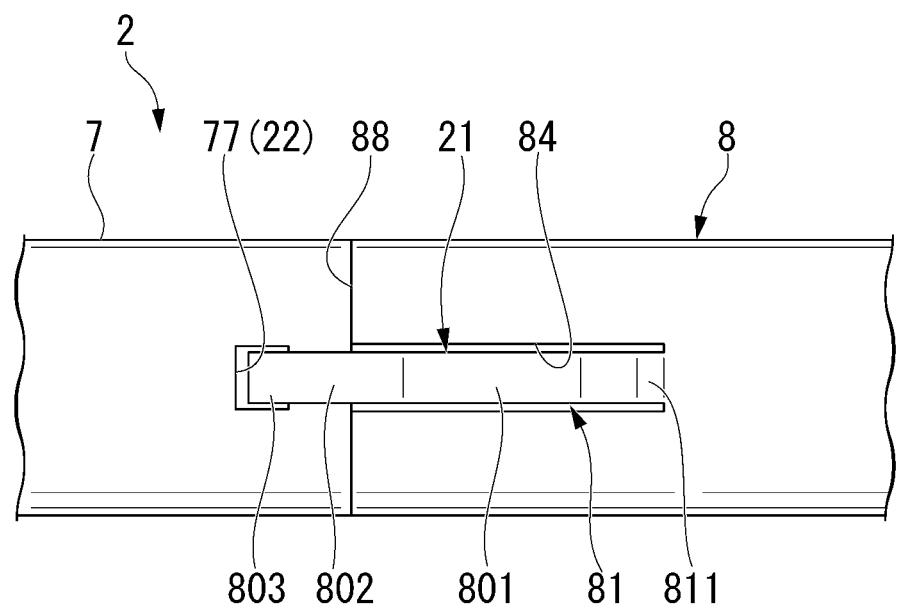
FIG. 2 is a side view showing a link mechanism of the ligation device according to the exemplary embodiment.
Figure 3:
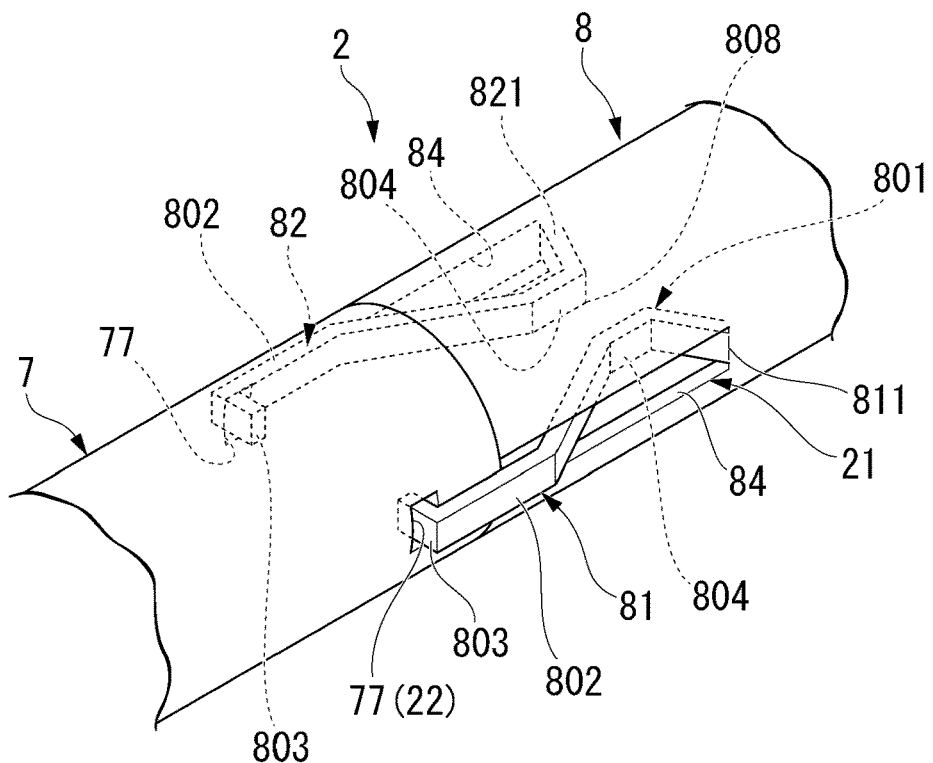
FIG. 3 is a perspective view showing the link mechanism of the ligation device according to the exemplary embodiment.
Figure 4:
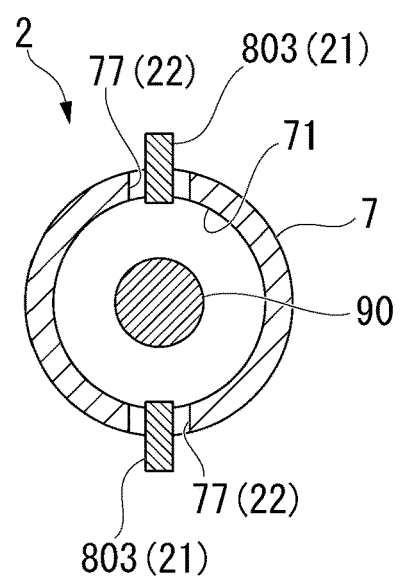
FIG. 4 is a cross-sectional view taken along line IV-IV shown in FIG. 1A.

A ligation device and an engagement method according to a first embodiment will be described with reference to FIGS. 1A to 9. FIG. 1A is an overall view showing the ligation device 1 according to the present embodiment. FIG. 2 is a side view showing a link mechanism 2 of the ligation device 1. FIG. 3 is a perspective view showing the link mechanism 2 of the ligation device 1. FIG. 4 is a cross-sectional view taken along line IV-IV shown in FIG. 1A.

The ligation device 1 according to the present embodiment is a device which is inserted into a body via a treatment tool channel of an endoscope and ligates a tissue in the body with a clip unit 4. As shown in FIG. 1A, the ligation device 1 includes the clip unit 4, a sheath 6, an operation wire 5, the link mechanism 2, and an operation part.

In the following description, a center line in a longitudinal direction in a state in which the ligation device 1 extends linearly is referred to as a longitudinal axis C. The operation part 50 side of the ligation device 1 is referred to as a proximal side, and the side opposite to the proximal side in a direction of the longitudinal axis C and on which the clip unit 4 is provided is referred to as a distal side.

Figure 1B:
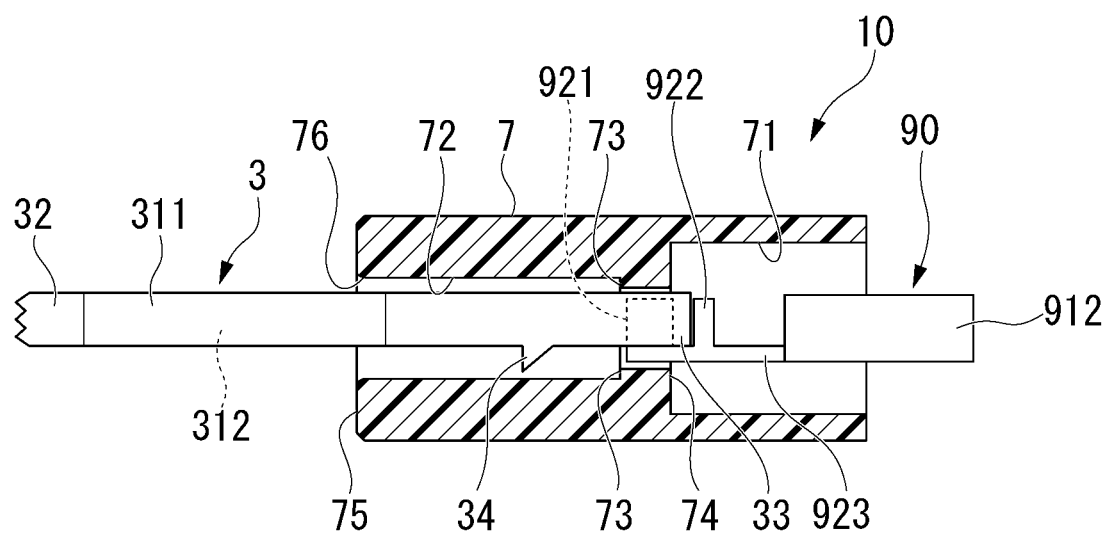
FIG. 1B is a partial cross-sectional view of a clip unit seen from a direction of arrow A shown in FIG. 1A.

As shown in FIGS. 1A and 1B, the clip unit 4 includes an arm member 3 and a holding tube 7. The arm member 3 has a first arm 311 and a second arm 312. The arm member 3 includes a connecting part 33 on the proximal sides of the first arm 311 and the second arm 312.

The arm member 3 is formed of, for example, a thin and elongated plate made of a metal such as stainless steel, a cobalt-chromium alloy, and titanium. The arm member 3 has the U-shaped connecting part 33 formed in a middle portion of the thin and elongated plate due to bending work being performed in a thickness direction, and both end portions of the plate form the first arm 311 and the second arm 312. The first arm 311 and the second arm 312 are configured to maintain air opening state in their natural state.

As shown in FIG. 1B, the connecting part 33 includes a pair of locking pieces 34. Each of the locking pieces 34 has a protruding shape of which a side on the proximal side is inclined with respect to the longitudinal axis C and a side on the distal side is orthogonal to the longitudinal axis C. The pair of locking pieces 34 protrude in a direction opposite to a direction orthogonal to the longitudinal axis C.

Claws 32 bent in a direction in which they approach each other are formed at end portions of the first arm 311 and the second arm 312 on the side opposite to the connecting part 33. The pair of arms 311 and 312 have a bending tendency in a direction in which they are separated from each other from the connecting part 33 side toward the claw 32 side.

The holding tube 7 is a tubular member having an insertion hole 70 which passes therethrough in the direction of the longitudinal axis C. The insertion hole 70 is a circular hole, and is formed due to a first insertion hole 71 formed on the proximal side and a second insertion hole 72 formed on the distal side being communicating.

An opening diameter of the first insertion hole 71 is larger than that of the second insertion hole 72, and a flange 73 which protrudes inward in a radial direction in an annular shape is formed at a boundary portion between the first insertion hole 71 and the second insertion hole 72. A distal wall 74 which extends outward from a proximal end 732 of the flange 73 in a direction orthogonal to the longitudinal axis C is formed.

The second insertion hole 72 has an opening size into which a proximal region of the arm member 3 is insertable. A tapered surface 76 which slightly expands toward a distal end surface 75 of the holding tube 7 is formed on a distal end portion of the second insertion hole 72.

The holding tube 7 is manufactured using a metal material such as stainless steel, a titanium alloy (Ti-6AL-4V, and the like), and a cobalt-chromium alloy, or a highly rigid resin material having appropriate elasticity such as polyphthalamide (PPA) and polyamide (PA).

A connection member 9 is a member which connects the arm member 3 to the Operation wire 5. The connection member 9 is inserted into the insertion hole 70 of the holding tube 7 and is provided on the proximal end side of the arm member 3. The connection member 9 has a main body 90, a wire engaging part 91, and a hook 92. The wire engaging part 91 is provided at a proximal end portion of the main body 90, and the hook 92 is provided on the distal side of the main body 90.

The wire engaging part 91 includes an engaging hole 911, a pair of engaging arms 912, and a locking part 913. The engaging hole 911 is a hole which opens at the proximal end of the main body 90, and has a size such that a connector 51 of the operation wire 5 which will be described later is capable of being inserted thereinto. Each of the pair of engaging arms 912 is configured to be bendable outward in the radial direction of the main body 90. The locking part 913 is provided at each of proximal end portions of the pair of engaging arms 912. The locking part 913 is provided at a position at which it faces the engaging hole 911 and covers the opening of the hole.

The hook 92 is provided to protrude in a distal direction further than the main body 90. FIG. 1B is a view seen from a direction of arrow A shown in FIG. 1A. The hook 92 has a hook shape so as to lock the connecting part 33 of the arm member 3. Specifically, the hook 92 includes a proximal portion 923 connected to the main body 90, and a first hook 921 and a second hook 922 which hold the connecting part 33. A gap is formed between the first hook 921 and the second hook 922 along a shape of the connecting part 33. A longitudinal cross-sectional area of the hook 92 in the direction orthogonal to the longitudinal axis C is smaller than a longitudinal cross-sectional area of the main body 90.

The arm member 3 and the connection member 9 are locked in the insertion hole 70 of the holding tube 7. Specifically, the first hook 921 of the connection member 9 is disposed inside a curved portion of the connecting part 33 of the arm member 3, and the connecting part 33 is inserted into the gap between the first hook 921 and the second hook 922 and is inserted into the insertion hole 70 in this state. With such a configuration, in the insertion hole 70, the arm member 3 and the connection member 9 are engaged with each other in a state that the hook 92 does not come off from the connecting part 33 in the direction of the longitudinal axis C and the radial direction of the holding tube 7.

The second insertion hole 72 has a size which allows a proximal region of the arm member 3 and the connection member 9 which are locked to each other to advance and retract in the second insertion hole 72 in the direction of the longitudinal axis C. Although the details will be described later, the arm member 3 and the connection member 9 is capable of advancing and retracting in the second insertion hole 72 as the operation wire 5 connected to the connection member 9 advances and retracts. The arm member 3 is configured such that the pair of arms 311 and 312 are opened and closed according to a relative position of the arm member 3 with respect to the second insertion hole 72 in the direction of the longitudinal axis C.

The operation part 50 includes an operation main body 501 and a slider 502. The slider 502 is provided to be slidable in the direction of the longitudinal axis C with respect to the operation main body 501.

A proximal end of the operation wire 5 is fixed to the slider 502 of the operation part 50, and the connector 51 is fixed to a distal end of the operation wire 5. The operation wire 5 is made of a single metal wire or a metal stranded wire. The operation wire 5 is inserted through the sheath 6.

The connector 51 is a member which connects the arm member 3 to the operation wire 5. The connector 51 has a connection end 511, a large diameter part 512, an engaged part 513, and a recessed part 514.

The connection end 511 has a tubular shape, and the distal end of the operation wire 5 is inserted therein and is fixed to the operation wire 5. The large diameter part 512 is located on the distal side from the connection end 511. The large diameter part 512 has a cylindrical shape. An outer diameter of the large diameter part 512 is larger than an outer diameter of the connection end 511. A tapered part 515 of which a diameter increases from the connection end 511 toward the large diameter part 512 is provided between the large diameter part 512 and the connection end 511.

The recessed part 514 is located between a proximal end of the engaged part 513 and the connection end 511. The recessed part 514 has a cylindrical shape having an outer diameter smaller than that of the engaged part 513 and the large diameter part 512. The engaged part 513 is provided at a distal end portion of the connector 51. The engaged part 513 has a conical shape, and protrudes from a distal end surface of the large diameter part 512 in the direction of the longitudinal axis C. A tip end 516 is disposed on the distal side of the engaged part 513.

The link mechanism 2 is a mechanism for engaging the holding tube 7 with a distal end of the sheath 6. The link mechanism 2 has a first link 21 and a second link 22. The first link 21 and the second link 22 is capable of being connected to each other, and the first link 21 serves as an engaging part, and the second link 22 serves as an engaged part. One of the first link 21 and the second link 22 may be provided on the holding tube 7, and the other may be provided on the distal end of the sheath 6. In the present embodiment, an example in which the first link 21 is provided on the sheath 6 and the second link 22 is provided on the holding tube 7 is shown.

The sheath 6 is a flexible and long tubular member. In the sheath 6, a lumen 61 is formed along the longitudinal axis C over the entire length. The sheath 6 is for example, a coil sheath formed by winding a wire made of stainless steel such as SUS301 tightly around the longitudinal axis C. A proximal end of the sheath 6 is connected to the operation main body 501 of the operation part 50. The lumen 61 opens to a distal end 62 of the sheath 6.

A distal tube 8 is fixed to the distal end 62 of the sheath 6. The distal tube 8 has a tubular shape substantially the same as inner and outer diameters of the sheath 6. The first link 21 is provided in the distal tube 8. The first link 21 includes a leg part 80. The leg part 80 includes a first leg 81 and a second leg 82.

As shown in FIGS. 2 and 3, the first leg 81 and the second leg 82 are integrally formed with the distal tube 8 at positions which face each other on the circumference of the distal tube 8. A pair of slits 84 which extend in the direction of the longitudinal axis C from a distal end 88 of the distal tube 8 toward the proximal side are formed at positions which face each other on the circumference of the distal tube 8. Proximal ends 811 and 821 of the first leg 81 and the second leg 82 are connected to proximal ends of the slits 84. The first leg 81 and the second leg 82 have the same shape and are disposed symmetrically with the longitudinal axis C interposed therebetween.

The first leg 81 and the second leg 82 have an elongated plate shape, the proximal ends 811 and 821 are fixed to the distal tube 8, and locking claws 803 on the distal end side are configured of free ends. Therefore, the first leg 81 and the second leg 82 are elastically deformed in inward and outward directions of the distal tube 8, and the pair of locking claws 803 are configured to be movable in the separating direction and the approaching direction. The first leg 81 and the second leg 82 are bent at a plurality of positions in the longitudinal direction, latch of the first leg 81 and the second leg 82 has an inner protruding part 801 and an outer parallel part 802, and the locking claw 803.

As shown in FIG. 1A, the inner protruding parts 801 are formed to protrude inward of the distal tube 8 from the proximal ends 811 and 821 of the first leg 81 and the second leg 82. The inner protruding parts 801 form inner parallel parts 804 in which the first leg 81 and the second leg 82 protrude inward and approaches each other, bend in the distal direction at the closest positions and extend parallel to each other, and are bent outward at the distal ends of the inner parallel parts 804 and are inclined outward of the distal tube 8.

The outer parallel parts 802 are located on a distal side of the inner protruding parts 801. The outer parallel parts 802 are formed at the outside of an outer circumferential surface of the distal tube 8 to extend parallel to each other along the longitudinal axis C.

The locking claws 803 are formed at the distal ends of the outer parallel parts 802 such that each of the first leg 81 and the second leg 82 are bent inward at substantially right angle and extending in a direction in which they approach each other. Each of the locking claws 803 has a dimension so that a length of protruding inward from the outer parallel part 802 slightly protrudes into the first insertion hole 71 of the holding tube 7. The locking claw 803 may have a protruding length so as to keep in the first insertion hole 71.

As shown in FIG. 1A, the leg part 80 has a smallest separation distance in the inner parallel parts 804 of the first leg 81 and the second leg 82. The inner parallel parts 804 of the first leg 81 and the second leg 82 become narrowed part 808 of the leg part 80. The narrowed part 808 has a gap which is narrower than an opening size of the lumen 61 and allows the operation wire 5 to be advanceable and retractable without contact.

The second link 22 is configured of a pair of through holes 77 which pass through the inside and the outside of the holding tube 7 in the radial direction in the first insertion hole 71. The pair of through holes 77 are formed at positions on the circumference of the holding tube 7 which face each other. Each of the through holes 77 has an opening into which the locking claw 803 is capable of being inserted.

In the ligation device 1, as shown in FIG. 1A, the proximal end of the sheath 6 is connected to the operation main body 501, the proximal end of the operation wire 5 is connected to the slider 502, and the operation wire 5 is accommodated in the lumen 61 of the sheath 6. The operation wire 5 extends to the distal end of the sheath 6. The operation wire 5 is configured to advance and retract with respect to the sheath 6 by sliding the slider 502 with respect to the operation main body 501.

The connector 51 of the operation wire 5 is disposed on the distal side from the narrowed part 808 of the distal tube 8 (the first link 21) provided in the distal portion of the sheath 6.

As shown in FIG. 1A, the operation wire 5 is connected to the slider 502 of the operation part 50. The operation wire 5 is accommodated in the lumen 61 of the sheath 6 and extends to the distal end portion of the sheath 6. The operation wire 5 is inserted into the gap between the inner parallel parts 804 of the narrowed part 808. The large diameter part 512 of the connector 51 of the operation wire 5 is disposed on the distal side from the narrowed part 808 of the first link 21.

The operation wire 5 is configured to be advanceable and retractable in the sheath 6 by sliding the slider 502 with respect to the operation main body 501. Since the gap of the narrowed part 808 (the separation distance between the inner parallel parts 804) is separated to such an extent that the operation wire 5 advances and retract without contact, the advance and retraction of the operation wires 5 are not hindered.

The ligation device 1 is configured to switch the sheath 6 and the holding tube 7 to be in a disengagement form and an engagement form by the link mechanism 2. The engagement form is a form in which the holding tube 7 is engaged with the sheath 6 via the link mechanism 2. The disengagement form is a form in which the holding tube 7 and the sheath 6 are not engaged with each other. Therefore, the disengagement form includes a form in which the engagement between the holding tube 7 and the sheath 6 is released after the engagement form, and a form of the holding tube 7 and the sheath 6 before the engagement.

The clip unit 4 is detachably mounted on the distal side of the sheath 6. In the engagement form, the proximal end of the holding tube 7 comes into contact with the distal end 88 of the distal tube 8 of the sheath 6, and the holding tube 7 and the sheath 6 are disposed coaxially. In this state, each of the locking claws 803 of the leg part 80 is inserted into the pair of through holes 77 of the holding tube 7, and the holding tube 7 is gripped by the leg part 80.

In a natural state in which no external force is applied to the leg part 80, since the pair of locking claws 803 are biased in the direction in which they approach each other, the engagement form of the holding tube 7 is stably maintained. In the engagement form, since the outer parallel part 802 is disposed close to the outer circumferential surface of the holding tube 7, it is possible to maintain the state in which the holding tube 7 is disposed coaxially with the sheath 6.

The engaged part 513 of the connector 51 of the operation wire 5 is inserted into the engaging hole 911 of the connection member 9, the engaged part 513 is held by the pair of engaging arms 912, and the clip and the operation wire 5 are connected via the connection member 9. In the engagement form, since the holding tube 7 is engaged with the sheath 6, the arm member 3 and the connection member 9 relatively move to each other in the direction of the longitudinal axis C as the operation wire 5 advances and retracts.

Figure 5:
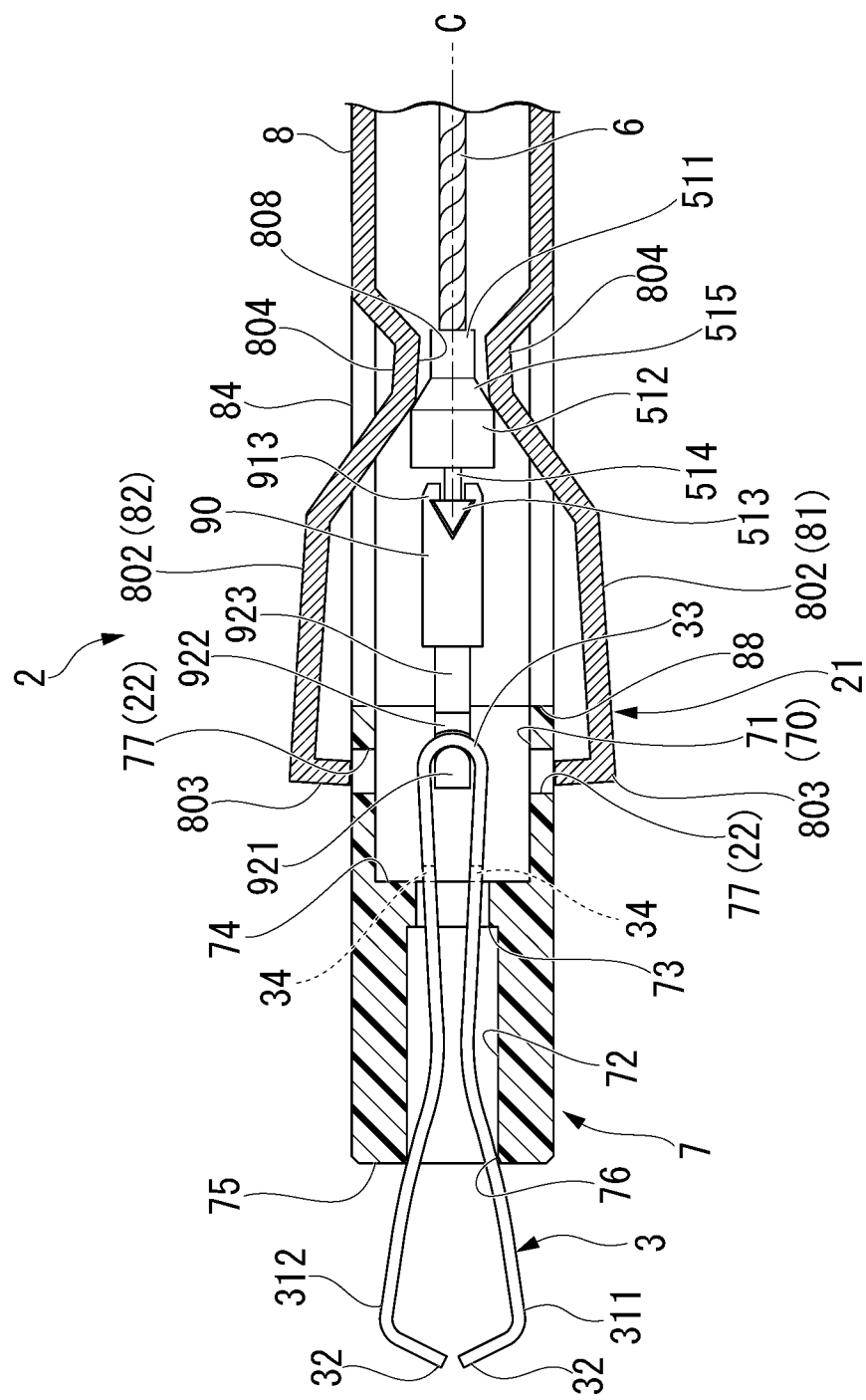
FIG. 5 is a schematic view showing a usage state of the ligation device according to the exemplary embodiment.

As shown in FIG. 5, in a state in which the first leg 81 and the second leg 82 are separated and opened each other, the locking claws 803 are not inserted into the pair of through holes 77 (the second link 22), and the clip unit 4 is in the disengagement form in which the clip unit 4 is not engaged with the sheath 6. Although details will be described later, the disengagement form and the engagement form is capable of being switched by advancing and retracting the operation wire 5.

Next, a usage mode and an engagement method of the ligation device 1 will be described.

Figure 6:
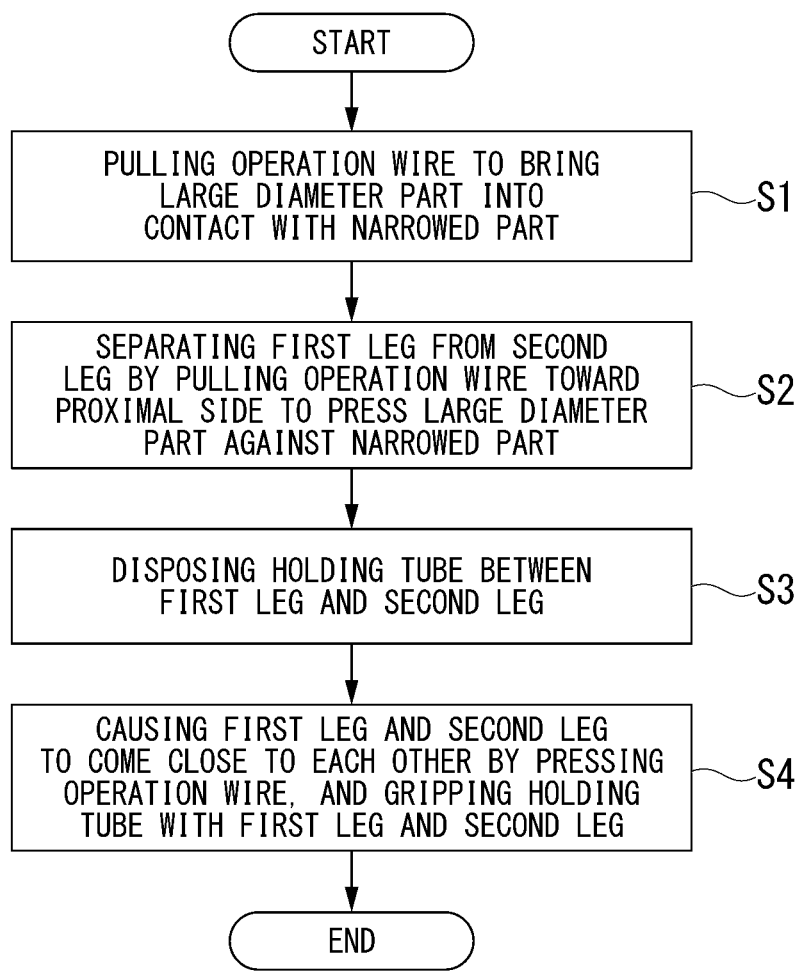
FIG. 6 is a flowchart showing an engagement method according to the exemplary embodiment.

FIG. 6 is a flowchart showing the engagement method according to the present embodiment.

First, the ligation device 1 is switched to the disengagement form to mount the clip unit 4 to the distal end of the sheath 6. An operator pulls the operation wire 5 to the proximal side and brings the large diameter part 512 into contact with the narrowed part 808 (a first step S1). A diameter of the large diameter part 512 of the connector 51 is larger than the separation distance of the narrowed part 808 in the natural state. Therefore, in a state in which the leg part 80 is closed, the large diameter part 512 does not move to the proximal side further than the narrowed part 808.

After the first step S1, as shown in FIG. 5, the operation wire 5 is further pulled to the proximal side to press the large diameter part 512 against the narrowed part 808, and the first leg 81 and the second leg 82 are separated from each other (a second step 82). When the operator slides the slider 502 to the proximal side and further retracts the operation wire 5, the tapered part 515 first enters the narrowed part 808, and then the large diameter part 512 presses the narrowed part 808 from the distal side of the narrowed part 808. As a result, as shown in FIG. 7, the pair of inner parallel parts 804 are elastically deformed in a direction in which they are separated from each other, the first leg 81 and the second leg 82 are separated from each other and protrude outward of the distal tube 8, and thus an outer diameter of the first link 21 is increased.

After the second step S2, the holding tube 7 is disposed between the first leg 81 and the second leg 82 (a third step S3). The clip unit 4 is disposed on the distal side of the distal tube 8.

Figure 7:
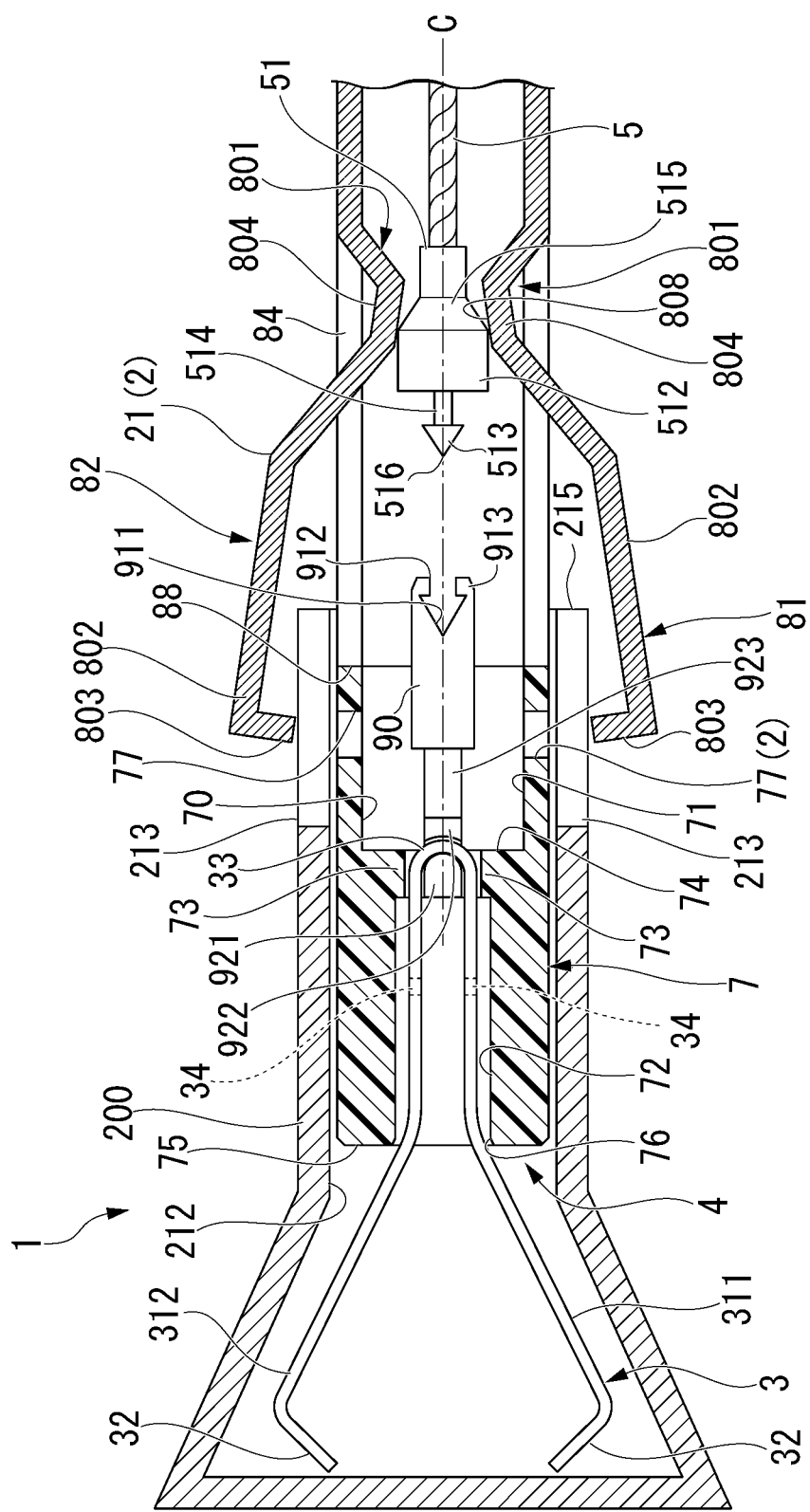
FIG. 7 is a schematic view showing the usage state of the ligation device according to the exemplary embodiment.

The clip unit 4 is accommodated in a cartridge 200 before it is mounted in the sheath 6 (refer to FIG. 7). The clip unit 4 is accommodated in advance in an accommodation part 212 of the cartridge 200 in a state in which the arms 311 and 312 in a distal region of the arm member 3 protrude from the holding tube 7 to the distal side. In the accommodation part 212, a space into which the sheath 6 is inserted in a state in which the clip unit 4 is accommodated therein is formed on the proximal side from the holding tube 7.

The cartridge 200 comes close to the distal tube 8 of the sheath 6, and the distal end 88 of the distal tube 8 is inserted into an opening 215 of the accommodation part 212 of the cartridge 200 on the proximal side, as shown in FIG. 7. The sheath 6 is advanced toward the cartridge 200, and the distal end 88 of the distal tube 8 is brought into contact with the proximal end of the holding tube 7.

After the third step S3, the engagement form is formed (a fourth step S4). When the operator advances the slider 502 to advance the operation wire 5 to the distal side, the large diameter part 512 moves to the distal side and the large diameter part 512 is separated from the narrowed part 808.

As a result, the pressing of the leg part 80 by the large diameter part 512 is released, and the first leg 81 and the second leg 82 come close to each other. A pair of slits 213 are formed at a proximal end portion of the cartridge 200. The pair of slits 213 communicate with each other inside and outside the accommodation part 212 and extend in the direction of the longitudinal axis C. The pair of slits 213 are provided at positions corresponding to the pair of through holes 77 (the second link 22) of the holding tube 7. The first leg 81 and the second leg 82 move in the direction in which they approach each other and pass through each of the slits 213 of the cartridge 200, and thus the locking claws 803 respectively enters the through holes 77. As a result, the first leg 81 and the second leg 82 grip and engage with the holding tube 7 to form the engagement form. After the engagement, the cartridge 200 is removed from the arm member 3.

Subsequently, due to a known method, the ligation device 1 is inserted into the body via the treatment tool channel of the endoscope, and the clip unit 4 comes close to the tissue to be ligated by the arm member 3. Since the holding tube 7 is engaged with the sheath 6 by the link mechanism 2 (refer to FIG. 4), when the sheath 6 is rotated around the longitudinal axis C, the holding tube 7 also rotates, thereby, an orientation of the pair of arms 311 and 312 of the arm member 3 around the longitudinal axis C is adjusted.

After that, when the slider 502 of the operation part 50 is advanced, the operation wire 5 advances with respect to the sheath 6. As the operation wire 5 advances, the clip 3 advances with respect to the holding tube 7, and the pair of arms 311 and 312 protrude from the accommodation part 212 to the distal side. In the pair of arms 311 and 312, the force pressing to portions which protrude from the accommodation part 212 to the distal side are released by the accommodation part 212 and the pair of arms 311 and 312 open in a direction in which they are separated from each other.

On the other hand, when the slider 502 is retracted with respect to the operation main body 501 and the operation wire 5 is retracted, the arm member 3 moves to the proximal side in the second insertion hole 72. As a result, proximal portions of the pair of arms 311 and 312 are inserted into the second insertion hole 72, the pair of arms 311 and 312 move in the direction in which they approach each other, and the arm member 3 starts to close.

In the clip unit 4, since the sheath 6 and the holding tube 7 are engaged with each other via the connection member 9, and the operation wire 5 is configured to be advanceable and retractable in this state, the arm member 3 is capable of advancing and retracting with respect to the holding tube 7. As a result, the arm member 3 is configured to re-grip the tissue. That is, when the connecting part 33 is located in the second insertion hole 72, the arm member 3 advances and retracts with respect to the holding tube 7. Therefore, when the tissue is sandwiched between the pair of claws 32 of the arm member 3, and then the arm member 3 is advanced relative to the holding tube 7, the pair of arms 311 and 312 are opened again, and a state in which the pair of claws 32 sandwich the tissue is released. The arm member 3 comes close to the tissue again in a state in which the pair of arms 311 and 312 are opened and retracted relative to the holding tube 7, the pair of claws 32 is configured to sandwich the tissue again.

When the tissue is gripped by the arm member 3 in a desired state, the operator retracts the slider 502 to retract the operation wire 5 and the arm member 3. When the arm member 3 retracts, in the proximal portion of the arm member 3, a loop shape of the connecting part 33 is reduced in diameter as the locking pieces 34 pass through the flange 73, and then the locking pieces 34 reach the first insertion hole 71. When the locking pieces 34 enter the first insertion hole 71, the loop shape of the connecting part 33 expands again, and a side of each of the locking pieces 34 on the distal side comes into contact with the distal wall 74 of the first insertion hole 71 and is locked. As a result, the advance of the arm member 3 with respect to the holding tube 7 is restricted, and the holding tube 7 and the arm member 3 are engaged with each other.

When the operation wire 5 is further pulled in a state in which the pair of arms 311 and 312 cannot be retracted in the second insertion hole 72, tension is applied to the connection member 9, the hook 92 is elastically deformed, and the engagement between the connecting part 33 of the arm member 3 and the hook is released. During the series of retracting operations, the large diameter part 512 presses the narrowed part 808 again, the leg part 80 opens outward, and the engagement between the pair of through holes 77 of the holding tube 7 and the leg part 80 is released. That is, the engagement between the hook 92 and the connecting part 33 of the arm member 3 and the engagement between the locking claw 803 and the through hole 77 (the engagement between the first link 21 and the second link 22) are released substantially at the same time by pulling the operation wire 5. As a result, the clip unit 4 is disengaged from the sheath 6 and the operation wire 5, and the tissue is ligated by the clip unit 4.

After the tissue is ligated with the clip unit 4, the ligation device 1 is removed from the body, and if necessary, the above-described disengagement form and engagement form are operated, and the second clip unit 4 is loaded again into the distal end of the sheath 6. When a plurality of sites of tissue are ligated with a plurality of clip units 4, the clip units is capable of being continuously loaded without exchanging the ligation device 1.

According to the ligation device 1 according to the present embodiment, since the link mechanism 2 is provided, the disengagement form and the engagement form is capable of being switched by the operation of the operation wire 5. Therefore, since the engagement and disengagement of the holding tube 7 and the sheath 6 is capable of being switched by the operation of the operation part 50, the clip unit 4 is capable of being easily mounted in the sheath 6. In the link mechanism 2, since the holding tube 7 is engaged with the sheath 6 by connecting the first link 21 and the second link 22, the clip unit 4 hardly comes off from the sheath 6 when it is mounted in the sheath 6.

According to the ligation device 1 according to the present embodiment, in the disengagement form, the first link 21 is configured to move outward of the distal tube 8 (the sheath 6) in the radial direction by the operation wire 5. That is, since the leg part 80 of the first link 21 moves in a direction in which it spreads outward of the distal tube 8, the holding tube 7 and the first link 21 do not interfere with each other, and the holding tube 7 is capable of being smoothly disposed on the distal side of the sheath 6.

According to the ligation device 1 according to the present embodiment, the first link 21 is configured to move outward in the radial direction of the sheath 6 by an operation of pulling the operation wire 5 to the proximal side. Therefore, the engagement between the holding tube 7 and the sheath 6 is capable of being released by a simple operation of pulling the operation wire 5.

According to the ligation device 1 according to the present embodiment, the leg part 80 in which the first leg 81 and the second leg 82 are close to each other engages with the second link 22, and when the first leg 81 and the second leg 82 are separated from each other by the operation of the operation wire 5, the engagement with the second link 22 is released. Therefore, the engagement form and the disengagement form of the first link 21 and the second link 22 are capable of being easily switched by the advance and retraction operation of the operation wire 5.

According to the ligation device 1 according to the present embodiment, the operation wire 5 is disposed between the first leg 81 and the second leg 82, and as the operation wire 5 is pulled, the large diameter part 512 presses the narrowed part 808, and the first leg 81 and the second leg 82 are separated from each other. Therefore, the engagement between the first link 21 and the second link 22 is released by a simple operation of pulling the operation wire 5, and the holding tube 7 is capable of being easily removed from the sheath 6.

According to the ligation device 1 according to the present embodiment, the first link 21 is provided in the sheath 6, and the second link 22 is provided in the holding tube 7. The leg part 80 is moved outward in the radial direction by the operation of the operation wire 5, and the first link 21 is capable of being disposed on the sheath 6 side. That is, the first link 21 which is a movable mechanism is disposed in the sheath 6, and the second link 22 which is the engaged part is disposed in the holding tube 7. As a result, the holding tube 7 to be placed in the body can be made into a simple structure.

Figure 17:
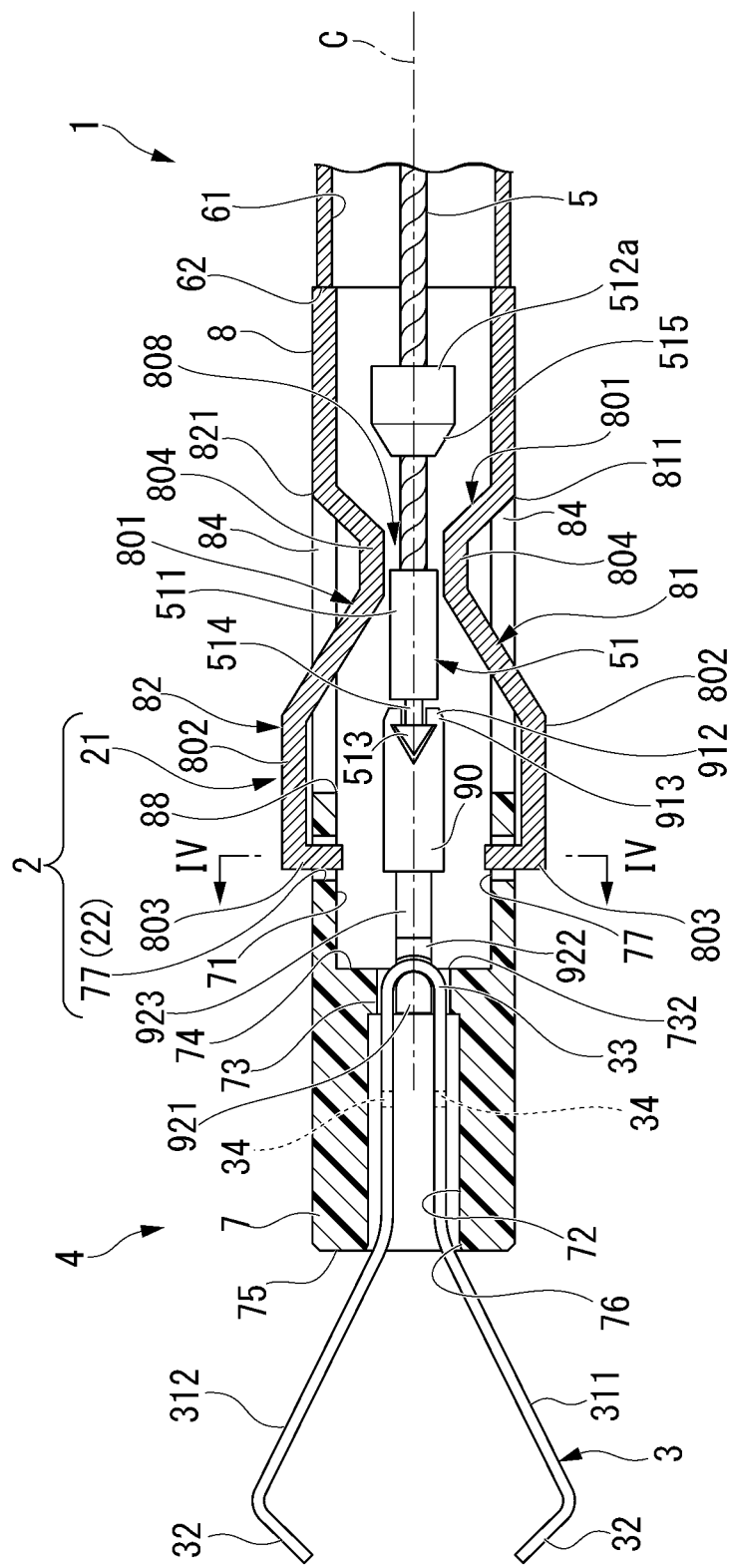
FIG. 17 is a partial cross-sectional view showing a modified example of the ligation device according to the first exemplary embodiment.

In the present embodiment, although the example in which the large diameter part 512 is disposed on the distal side of the narrowed part 808, and the leg part 80 is opened by a pressing force by which the large diameter part 512 presses the narrowed part 808 to the proximal side due to the retraction of the operation wire 5 has been described, the configuration in which the leg part 80 opens is not limited thereto. For example, as in a modified example shown in FIG. 17, in the operation wire 5, a large diameter part 512a may be provided separately from the connector 51 at a position at which it is separated from the connector 51 to the proximal side, and the large diameter part 512a may be disposed on the proximal side of the narrowed part 808. In this case, the large diameter part 512a pushes the narrowed part 808 in the distal direction to open the leg part 80 by advancing the operation wire 5 in the distal direction.

Second Embodiment

Figure 8:
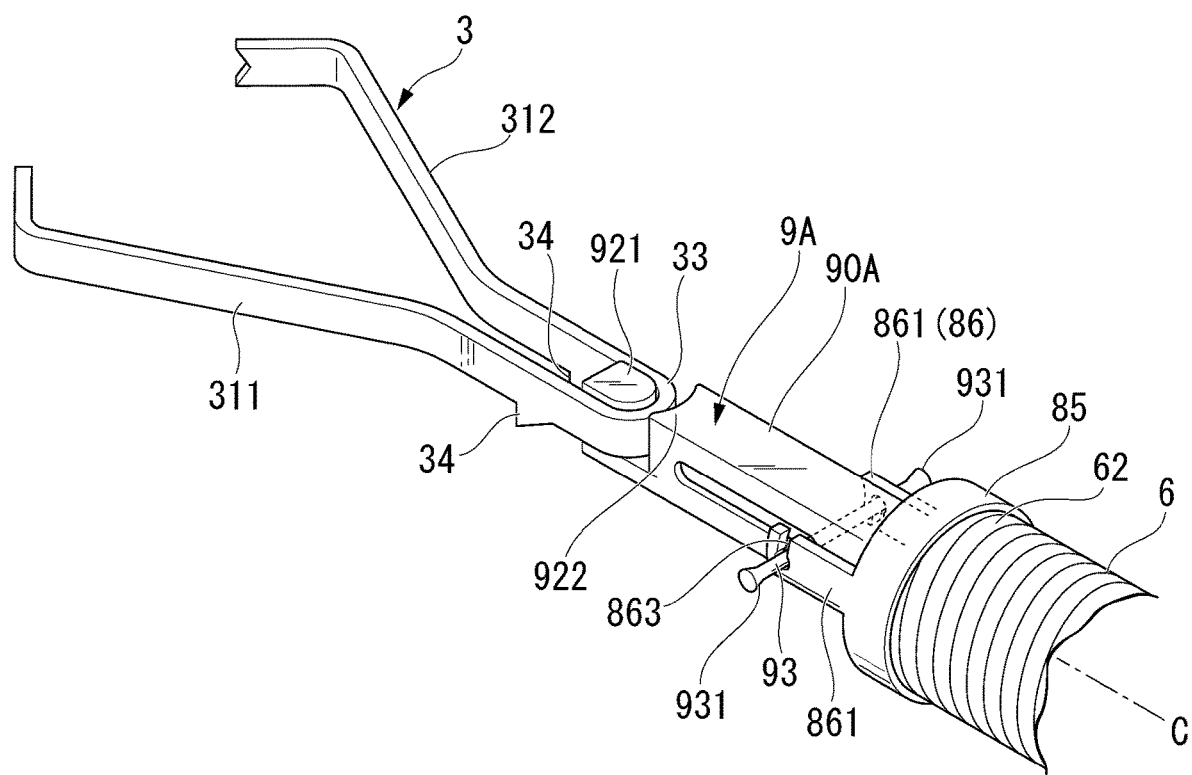
FIG. 8 is a perspective view showing a link mechanism of a ligation device according to another exemplary embodiment.
Figure 9:
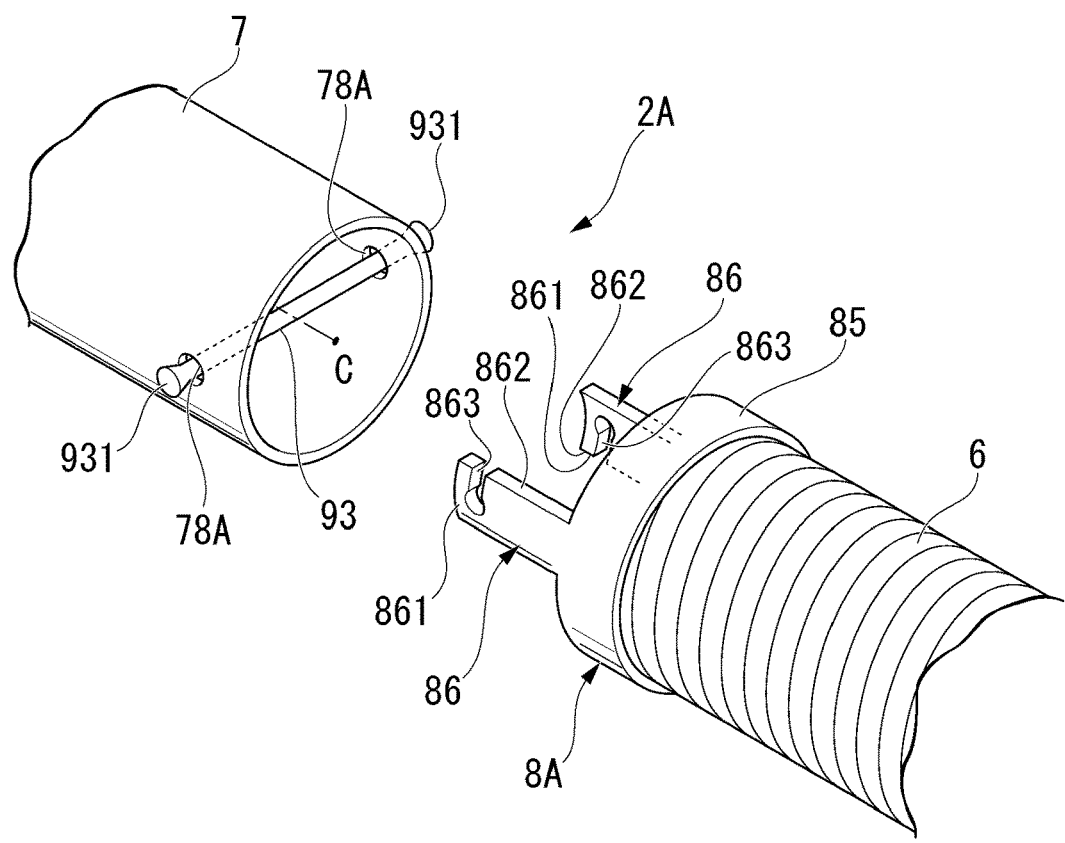
FIG. 9 is a perspective view showing the link mechanism of the ligation device according to the second exemplary embodiment.

A ligation device 1A according to a second embodiment will be described with reference to FIGS. 8 to 12. In the following description, the same components as those already described in the first embodiment are designated by the same reference numerals, and duplicate description thereof will be omitted. FIGS. 8 and 9 are perspective views showing a link mechanism 2A in a distal region of the ligation device 1A according to the present embodiment. In FIG. 8, the description of the holding tube 7 is omitted. In FIG. 9, the description of the clip unit 4A is omitted.

The ligation device 1A according to the present embodiment is different from the first embodiment in a configuration of a link mechanism and a configuration of a connection member 9A of a clip unit 4A. In a link mechanism 2A of the present embodiment, the first link 21 is provided at a distal tube 8A, and the second link 22 is provided at the clip unit 4. The distal tube 8A includes a substantially tubular part 85 and a pair of locking pieces 86. The tubular part 85 is fixed to the distal end 62 of the sheath 6. As shown in FIGS. 8 and 9, the pair of locking pieces 86 are provided to protrude to the distal side further than the tubular part 85 in the direction of the longitudinal axis C. The pair of locking pieces 86 are provided at positions facing each other with the central axis of the sheath 6 interposed therebetween.

Each of the locking pieces 86 is a plate-shaped member elongated in the direction of the longitudinal axis C, and is curved along an arc shape of an outer circumferential portion of the tubular part 85. A hook part 861 is formed at a distal end portion of each of the locking pieces 86. The hook part 861 is formed by cutting out a locking groove 863 (a groove part) extending in a circumferential direction of the tubular part 85 from a side portion 862 of the locking piece 86 in the direction of the longitudinal axis C. The pair of locking grooves 863 open in different directions along the circumferential direction of the sheath 6.

The connection member 9A of the clip unit 4A has a main body 90A, a hook 92, and a shaft 93. The main body 90A has a rectangular parallelepiped shape elongated in the direction of the longitudinal axis C, and a slide hole 902 which extends in the direction of the longitudinal axis C is formed therein. The slide hole 902 passes through a pair of side walls of the main body 90A. A gap along a shape of the connecting part 33 is formed between a distal end of the main body 90A and a first hook 921, and the distal end portion of the main body 90A serves as a second hook 922.

The shaft 93 is a rod-shaped member which is longer than a diameter of the holding tube 7A. The shall 93 is, for example, a rod-shaped member made of a resin or a metal. The shaft 93 is inserted into the slide hole 902 in a direction intersecting the longitudinal axis C, and both end portions 931 (protrusions) thereof protrude outward from the slide hole 902. The both end portions 931 are slightly larger in diameter than an intermediate region of the shaft 93.

As shown in FIG. 9, a pair of engaging holes 78A through which the shaft 93 is capable of being inserted are formed at the proximal end portion of the holding tube 7 to pass therethrough in the radial direction. As shown in FIG. 9, the engaging holes 78A have a circular shape in a side view. The engaging holes 78A are formed symmetrically at positions facing each other with the central axis of the holding tube 7 interposed therebetween.

Although illustration of the holding tube 7 is omitted in FIG. 8, the shaft 93 is inserted through the engaging hole 78A and the slide hole 902 in a state in which the main body 90A is inserted into the holding tube 7. An opening diameter of the engaging hole 78A is slightly smaller than a diameter of both end portions 931 of the shaft 93. Therefore, the shaft 93 is hard to fall off from the engaging hole 78A and the slide hole 902, and is slidably inserted through the slide hole 902.

Figure 10:
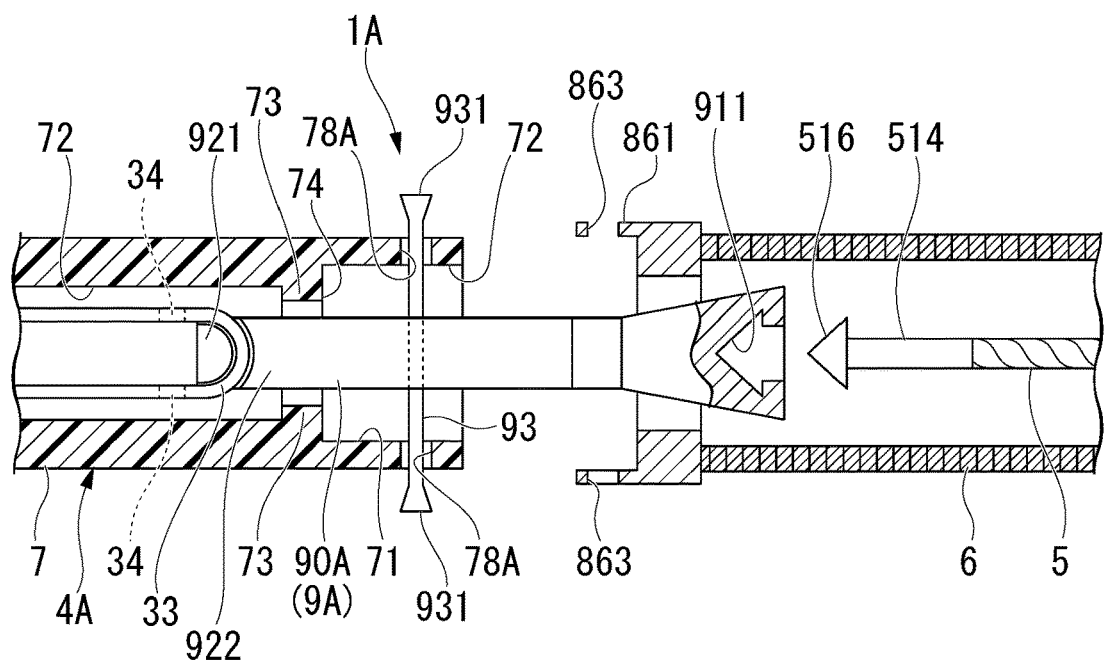
FIG. 10 is a schematic view showing an engagement method of the ligation device according to the second exemplary embodiment.

Next, the usage mode of the ligation device 1 of the present embodiment will be described with reference to FIGS. 10 to 12.

The shaft 93 is inserted thorough the slide hole 902 and the engaging hole 78A, and both end portions 931 protrude outward of the holding tube 7. In a state in which the connecting part 33 of the arm member 3 is disposed between the first hook 921 and the second hook 922, the connection member 9A and the connecting part 33 of the arm member 3 are inserted into the first insertion hole 71 of the holding tube 7. The holding tube 7 comes close to the distal tube 8A in a state in which the engaging holes 911 of the connection member 9A and the pair of engaging arms 912 protrude from the proximal end of the holding tube 7. The pair of locking pieces 86 come into contact with the outer circumferential surface of the holding tube 7, are pressed toward the outer circumferential side by the holding tube 7 to be elastically deformed, and are externally inserted onto the holding tube 7. As a result, the holding tube 7 is disposed between the pair of locking pieces 86, and both end portions 931 of the shaft 93 protrude outward further than the pair of locking pieces 86 in the radial direction.

When the operator rotates the sheath 6 clockwise around the longitudinal axis C in a state in which both end portions 931 of the shaft 93 and the locking grooves 863 are disposed close to each other, both end portions 931 of the shaft 93 are inserted into the pair of locking grooves 863, and the connection member 9A and the pair of locking pieces 86 are locked via the shaft 93. Thus, the sheath 6 and the holding tube 7 are engaged with each other.

When the proximal end of the holding tube 7 comes into contact with the distal end of the distal tube 8A, the operation wire 5 is advanced, and the engaged part 513 is pressed into the engaging hole 911 of the connection member 9A to connect the operation wire 5 to the connection member 9A.

In the engagement form, the clip unit 4 is engaged to be rotatable according to the rotation of the sheath 6 around the longitudinal axis C. Since the slide hole 902 is formed to extend in the direction of the longitudinal axis C, the connection member 9A is configured to be advanceable and retractable with respect to the sheath 6 and the holding tube 7 when the operation wire 5 is advanced and retracted. Therefore, when the operation wire 5 is advanced, the pair of arms 311 and 312 of the arm member 3 are opened in a direction in which they are separated from each other. When the operation wire 5 is retracted, the pair of arms 311 and 312 approach each other, and the arm member 3 is closed.

Figure 11:
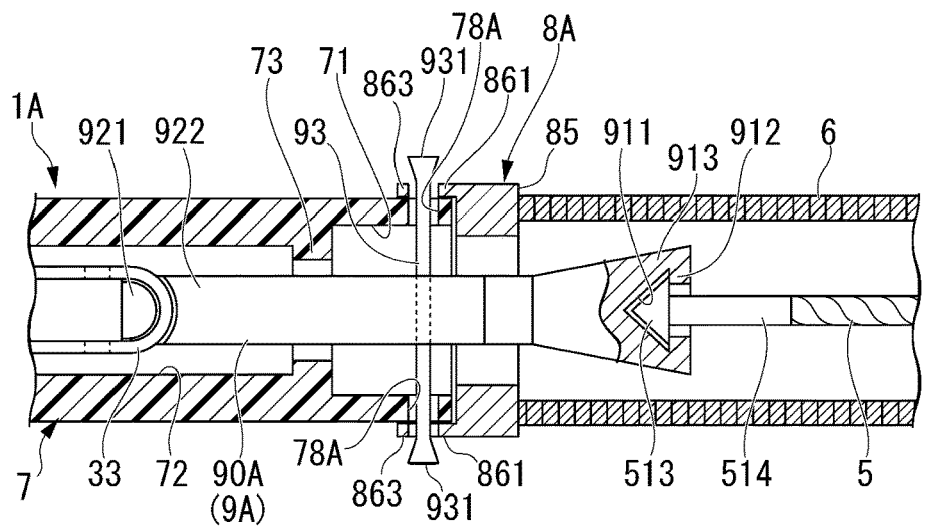
FIG. 11 is a schematic view showing a usage state of the ligation device according to the second exemplary embodiment.
Figure 11:
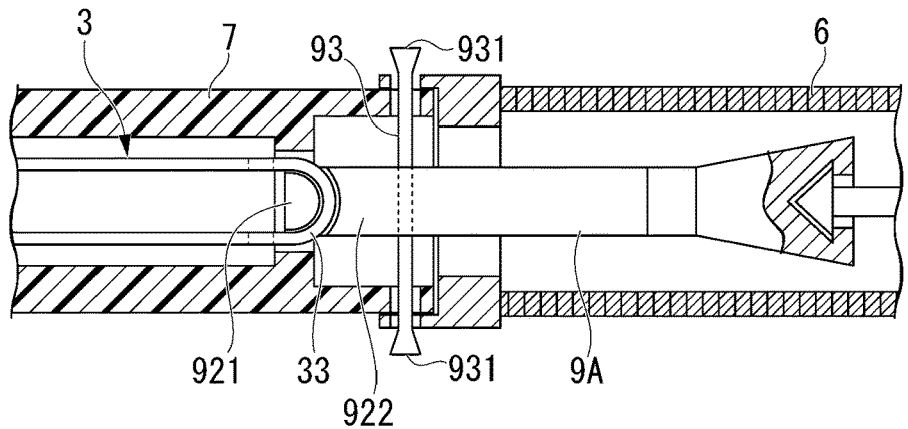
Figure 11:
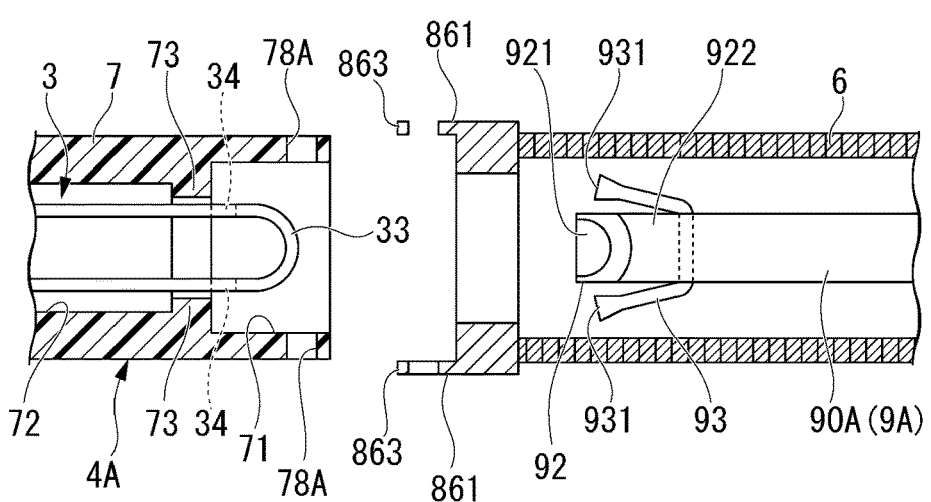
Figure 12:
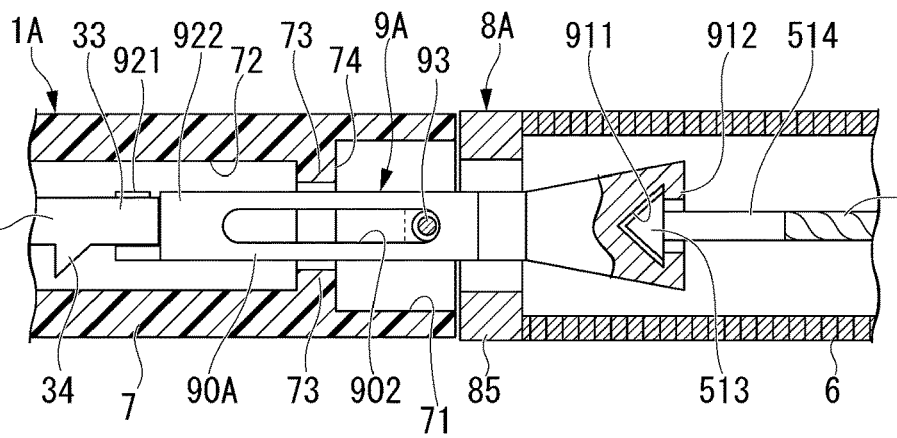
FIG. 12 is a schematic view showing the usage state of the ligation device according to the second exemplary embodiment.
Figure 12:
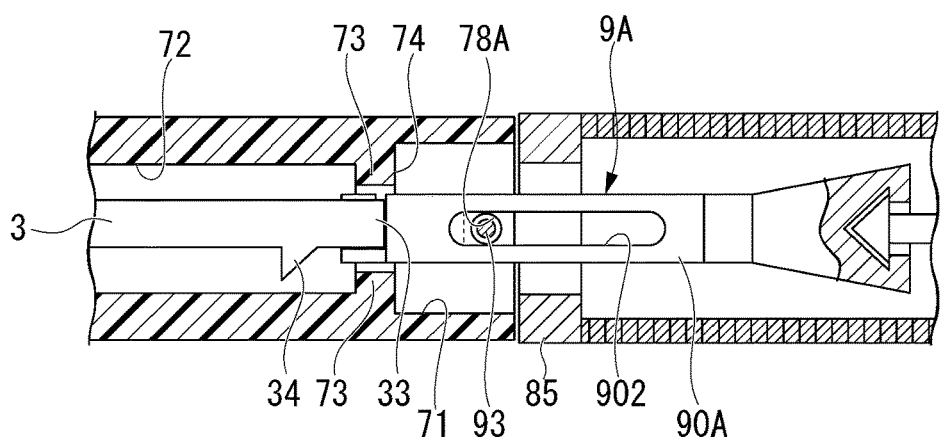
Figure 12:
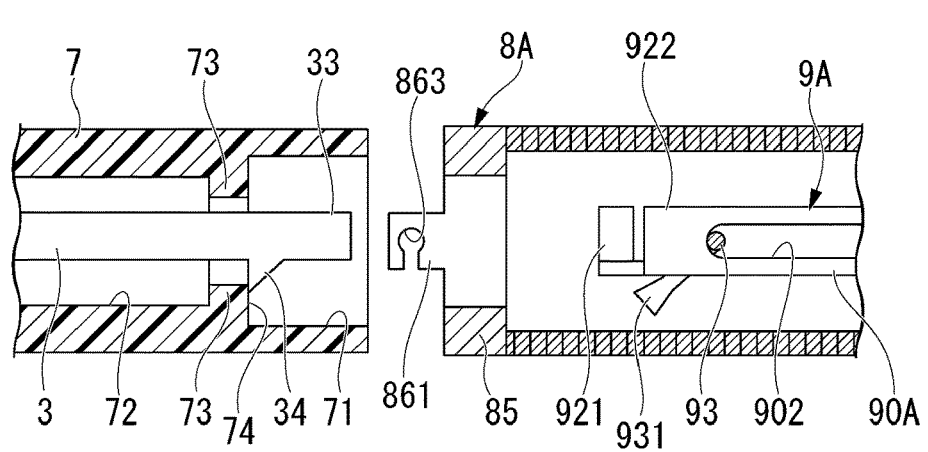

When the operation wire 5 is retracted after the tissue is gripped by the arm member 3, the connection member 9A moves to the proximal side and comes into contact with a distal end of the slide hole 902 (refer to (b) of FIG. 11 find (b) of FIG. 12). When the operation wire 5 is further retracted, as shown in (c) of FIG. 11 and (c) of FIG. 12, the shaft 93 buckles, and a force drawn to the proximal side acts on both end portions 931 of the shaft 93, and the shaft 93 retracts into the lumen 61 of the sheath 6 while expanding each of the locking grooves 863 and the locking holes 78A. As a result, the engagement between both end portions 931 of the shaft 93 and the engaging holes 78A and the pair of hook parts 861 is released. Then, the first hook 921 bends in the first insertion hole 71, the locking of the connecting part 33 due to the hook 92 is released, the holding tube 7 is in a non-engaged form, and the connection between the connection member 9A and the clip unit 4A is released.

According to the ligation device 1A according to the present embodiment, the clip unit 4 is capable of being easily mounted in the sheath 6 as in the first embodiment, and the clip unit 4 does not easily come off from the sheath 6 at the time of mounting.

According to the ligation device 1A according to the present embodiment, the engagement between the holding tube 1A and the sheath 6 can be released by a simple operation of rotating the sheath 6 around the longitudinal axis C. The engagement form and the disengagement form of the first link 21 and the second link 22 are capable of being easily switched by the rotation operation around the longitudinal axis C and the advance and retraction operation in the direction of the longitudinal axis C in the sheath 6.

Third Embodiment

Figure 13:
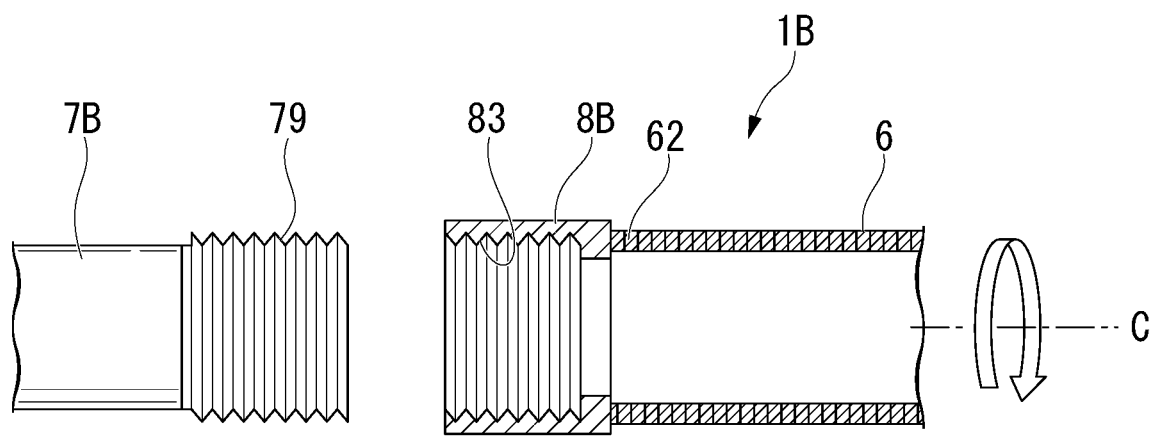
FIG. 13 is a schematic view showing a link mechanism of a ligation device according to a third exemplary embodiment.
Figure 14:
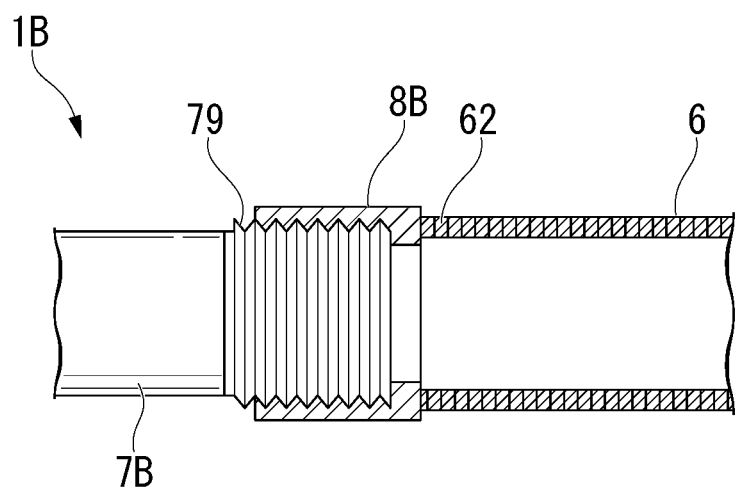
FIG. 14 is a schematic view showing the link mechanism of the ligation device according to the third exemplary embodiment.

A ligation device 1B according to a third embodiment will be described with reference to FIGS. 13 and 14. FIGS. 13 and 14 are schematic views showing a link mechanism of the ligation device 1B according to the present embodiment. The link mechanism 2B has a screw structure of a male screw and a female screw. As shown in FIGS. 13 and 14, a holding tube 7B has a male screw part 79 (the first link 21) forming a thread on an outer circumferential surface of a proximal end portion thereof. A screw groove 83 (the second link 22) is provided in an inner circumferential surface of a distal tube 8B provided at the distal end 62 of the sheath 6.

Figure 15:
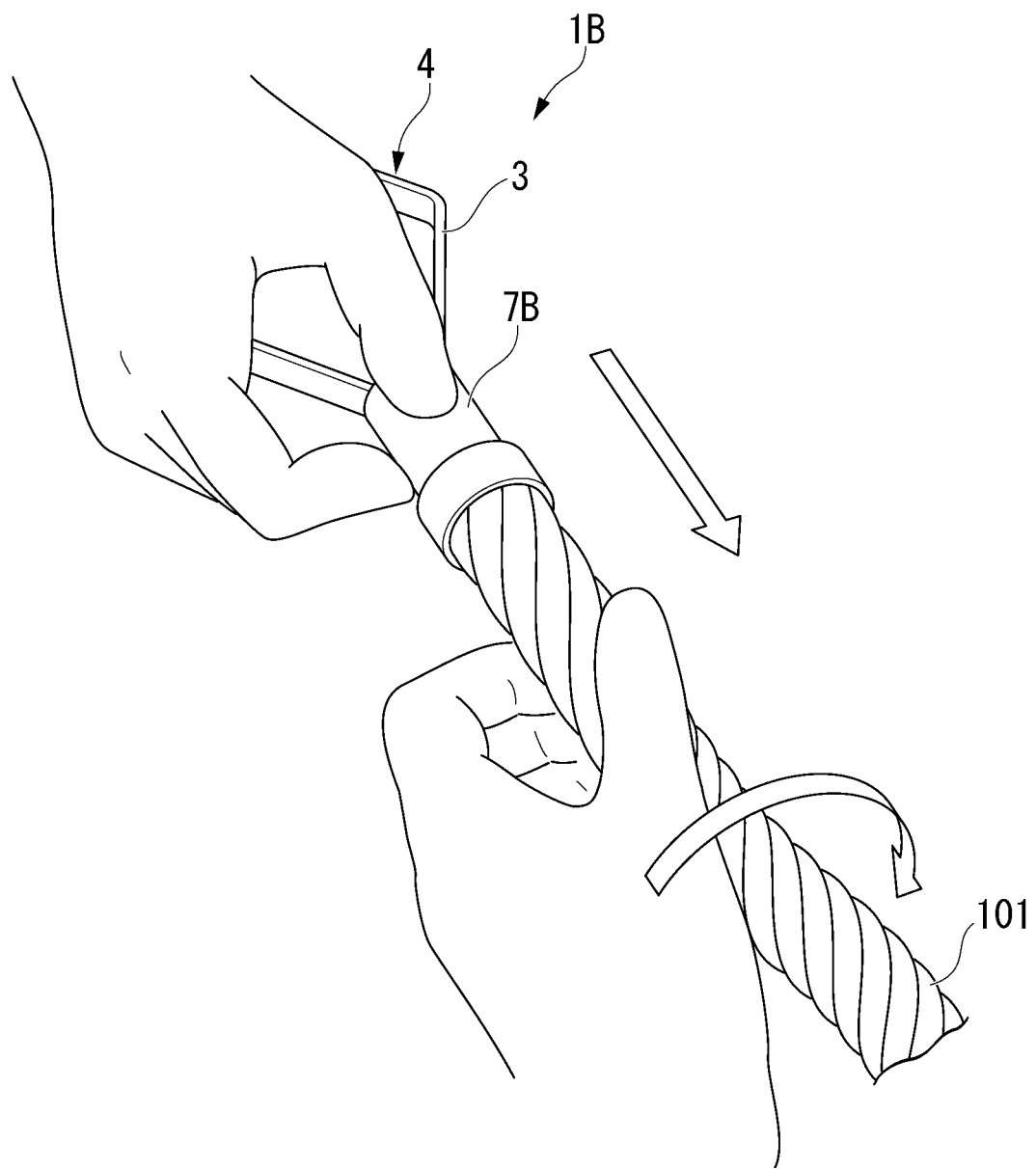
FIG. 15 is a schematic view showing a usage state of the ligation device according to the third exemplary embodiment.

As shown in FIG. 13, the disengagement form is a state in which the male screw part 79 of the holding tube 7B and the screw groove 83 of the distal tube 8B are not engaged with each other. As shown in FIG. 14, the engagement form is a state in which the male screw part 79 is inserted into the distal tube 7B and screwed into the screw groove 83. As shown in FIGS. 14 and 15, the holding tube 7B is engaged with the distal tube 8B by an operation in which the operator grips the holding tube 7B of the clip unit 4 and the sheath 6 and screws the holding tube 7B into the distal tube 8B. When the operator grips the holding tube 7B and the distal tube 8B and releases the screw between the male screw part 79 and the screw groove 83, the disengagement form is obtained.

According to the ligation device 1B according to the present embodiment, it is possible to switch between the disengagement form and the engagement form by rotating the holding tube 7B with respect to the sheath 6. According to the ligation device 1B according to the present embodiment, since the link mechanism 2 is provided, the disengagement form and the engagement form are capable of being switched by a simple operation. When the clip unit 4 is mounted in the sheath 6, the holding tube 7 is hard to come off from the sheath 6.

In the present embodiment, an example of the arm member 3 in which the first arm 311 and the second arm 312 move with respect to the holding tube 7 has been shown, but the configuration of the clip is not limited thereto. For example, a clip may have a configuration in which the first arm and the second arm are formed separately.

In the present embodiment, an example in which the screw groove is provided in the distal tube 8B and the male screw part is provided on the holding tube 7B has been shown, but the link mechanism is not limited thereto. For example, the screw groove may be provided in the first accommodation part 221 of the holding tube 7B, the male screw part may be provided on an outer circumferential surface of the distal tube 8B, and the holding tube 7B may be externally engaged with the distal tube.

Figure 16:
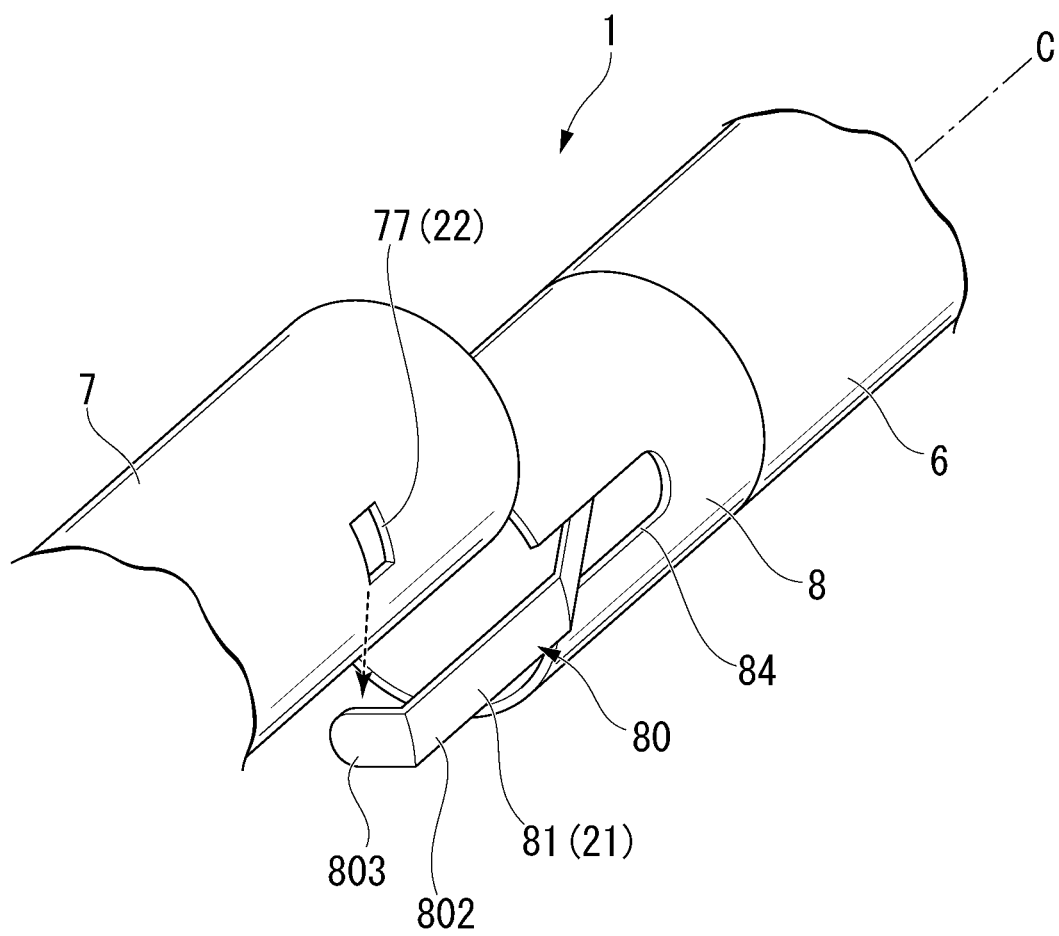
FIG. 16 is a perspective view showing a modified example of the link mechanism of the ligation device according to the first exemplary embodiment.

In the first embodiment, an example in which the holding tube 7 comes close to the distal tube 8 from the distal side has been shown, but the direction in which the holding tube 7 comes close to the distal tube 8 is not limited thereto. For example, as shown in FIG. 16, in a state in which the leg part 80 opens, the holding tube 7 may be disposed between the first leg 81 and the second leg in a direction orthogonal to the longitudinal axis C of the sheath 6. In case of the such a configuration, for example, when the operation in which the arm member 3 and the operation wire 5 are connected to each other is performed by inserting the engaged part 513 of the connector 51 into the engaging hole 911 of the connection member 9 in the direction orthogonal to the longitudinal axis C of the sheath 6, the connection of the arm member 3 to the operation wire 5 and the engagement of the holding tube 7 with the sheath 6 are capable of being performed simultaneously by a single operation.

In the first embodiment, although the example in which the first link is provided in the sheath 6 and the second link is provided in the holding tube 7 has been shown, the first link may be provided in the holding tube, and the second link may be provided in the sheath.

The clip unit 4 shown in the above-described embodiment is an example of a clip unit which can be ligated into the body using the ligation device, and the mode of the clip unit is not limited thereto. For example, it may be a clip unit having two arms independently, or the like. This ligation device can be suitably used for a clip unit which can perform the re-gripping.

Although the embodiments have been described in detail with reference to the drawings, the specific configuration is not limited to the present embodiment, and a design and the like change within a range not departing from the gist of the present invention are also included.

In addition, the components shown in each of the above-described embodiments and modified examples can be appropriately combined and configured.

What is claimed is:

1. A ligation device comprising:
 a clip including:
  a first arm;
  a second arm; and
  a tube including a through hole, the tube being configured to accommodate at least a part of the first arm and the second arm;
 a sheath;
 a wire located in the sheath;
 a connector connecting the wire to the clip, and
 a deformable leg engaging the sheath with the clip, the deformable leg including first and second legs, wherein:
 at least one of the first leg and the second leg has a first terminal end that is configured to be inserted into the through hole, a second terminal end located opposite the first terminal end, and an intermediate section located between the first terminal end and the second terminal end, wherein:
 the intermediate section is located radially inward of an inner surface of a distal end of the sheath,
 the intermediate section is located proximally relative to the distal end of the sheath,
 when the connector is located between the first leg and the second leg, the intermediate section receives an outward force from the connector,
 when the connector is located between the first leg and the second leg, at least a portion of the connector is located in the sheath,
 the first terminal end has a most distal end surface, and
 the most distal end surface is located inside an outer surface of the tube.

2. The ligation device according to claim 1, wherein the through hole comprises first and second through holes, the first terminal end of the first leg is configured to be inserted into the first through hole, and the first terminal end of the second leg is configured to be inserted into the second through hole.

3. The ligation device according to claim 1, wherein the through hole extends in a direction intersecting a longitudinal axis direction of the sheath, and the first terminal end extends along the direction.

4. The ligation device according to claim 1, wherein the through hole comprises first and second through holes, the first terminal end of the first leg has a plate shape, the first terminal end of the first leg is configured to be inserted in the first through hole, and the first terminal end of the second leg has a plate shape, the first terminal end of the second leg is configured to be inserted in the second through hole.

5. The ligation device according to claim 1, wherein
the through hole has a first length and a second length,
the first length is a length in a longitudinal direction of the clip,
the second length is a length in a direction intersecting the longitudinal direction of the clip, and
the first length is shorter than the second length.

6. The ligation device according to claim 1, wherein
the through hole comprises first and second through holes,
each of the first and second through hole has a first length and a second length,
the first length is a length in a longitudinal direction of the clip,
the second length is a length in a direction intersecting the longitudinal direction of the clip, and
the first length is shorter than the second length.

7. The ligation device according to claim 1,
wherein the connector is configured to directly abuts the intermediate section,
when the connector directly abuts the first leg and the second leg, the intermediate section receives an outward force from the connector, and
when the connector directly abuts the first leg and the second leg, at least a portion of the connector is located in the sheath.

8. The ligation device according to claim 1, wherein the tube directly abuts the sheath.

9. A ligation device comprising:
a clip including:
a first arm;
a second arm; and
a tube including a through hole, the tube being configured to accommodate at least a part of the first arm and the second arm;
a sheath; and
a deformable leg engaging the sheath with the clip, the deformable leg including first and second legs, wherein:
at least one of the first leg and the second leg has a first terminal end that is configured to be inserted into the through hole, a second terminal end located opposite the first terminal end, and an intermediate section located between the first terminal end and the second terminal end, wherein:
the intermediate section is protruded radially inward more than an inner surface of a distal end of the sheath,
the intermediate section is located proximally relative to the distal end of the sheath,
the first terminal end has a most distal end surface, and
the most distal end surface is located inside an outer surface of the tube.

10. The ligation device according to claim 9, further comprising:
a wire located in the sheath; and
a connector connecting the wire to the clip, and
wherein the connector is configured to directly abut the intermediate section.

11. The ligation device according to claim 9, further comprising:
a wire located in the sheath; and
a connector connecting the wire to the clip, and
wherein, when the connector is located between the first leg and the second leg, the intermediate section receives an outward force from the connector.

12. The ligation device according to claim 11, wherein, when the connector is located between the first leg and the second leg, at least a portion of the connector is located in the sheath.

13. The ligation device according to claim 9, further comprising:
a wire located in the sheath; and
a connector connecting the wire to the clip, and
wherein, when the connector is located between the first leg and the second leg, at least a portion of the connector is located in the sheath.

14. The ligation device according to claim 9, wherein the tube directly abuts the sheath.

15. The ligation device according to claim 9, wherein
the through hole comprises first and second through holes,
the first terminal end of the first leg is configured to be inserted into the first through hole, and
the first terminal end of the second leg is configured to be inserted into the second through hole.

16. The ligation device according to claim 9, wherein
the through hole comprises first and second through holes,
the first terminal end of the first leg extends along a first direction intersecting a longitudinal axis direction of the sheath, the first terminal end of the first leg is configured to be inserted in the first through hole, and
the first terminal end of the second leg extends along a second direction intersecting the longitudinal axis direction, the first terminal end of the second leg is configured to be inserted in the second through hole.

17. The ligation device according to claim 9, wherein
the through hole extends in a direction intersecting a longitudinal axis direction of the sheath, and
the first terminal end extends along the direction.

18. The ligation device according to claim 9, wherein
the through hole comprises first and second through holes,
the first terminal end of the first leg has a plate shape, the first terminal end of the first leg is configured to be inserted in the first through hole, and
the first terminal end of the second leg has a plate shape, the first terminal end of the second leg is configured to be inserted in the second through hole.

19. The ligation device according to claim 9, wherein
the through hole has a first length and a second length,
the first length is a length in a longitudinal direction of the clip,
the second length is a length in a direction intersecting the longitudinal direction of the clip, and
the first length is shorter than the second length.

20. The ligation device according to claim 9, wherein
the through hole comprises first and second through holes,
each of the first and second through hole has a first length and a second length,
the first length is a length in a longitudinal direction of the clip,
the second length is a length in a direction intersecting the longitudinal direction of the clip, and
the first length is shorter than the second length.

* * * * *